Feb. 5, 1952 M. H. L. SÉDILLE 2,584,232
GAS TURBINE POWER PLANT, INCLUDING MEANS TO TREAT COMBUSTION
PRODUCTS BETWEEN SUCCESSIVE STAGES OF EXPANSION
Filed Aug. 4, 1947 2 SHEETS—SHEET 1
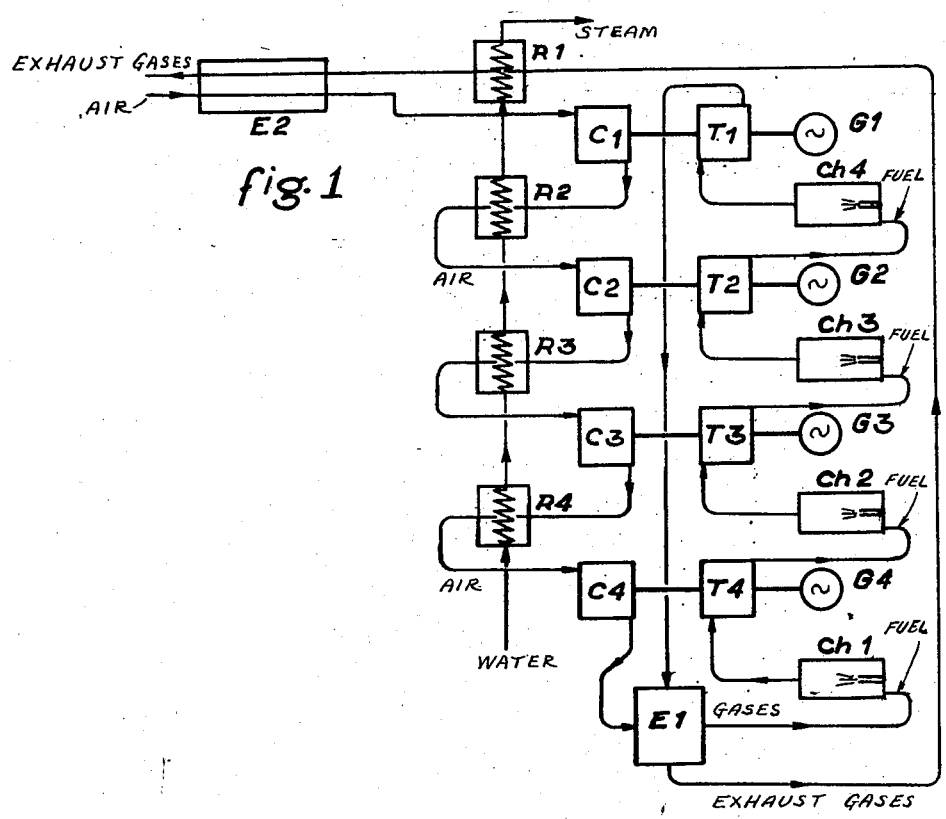
INVENTOR
M. H. L. Sédille
By Watson, Cole, Grindle & Watson

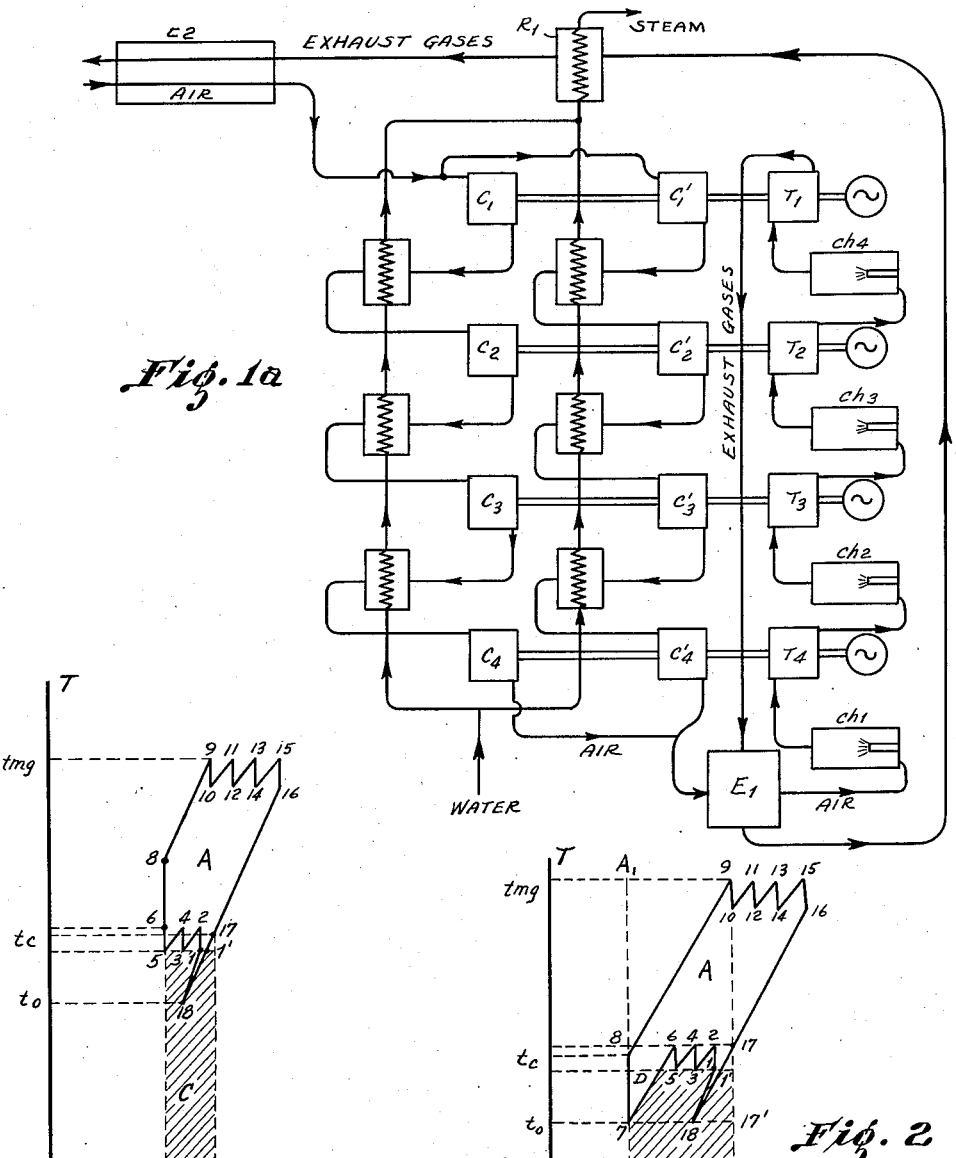

UNITED STATES PATENT OFFICE

2,584,232

GAS TURBINE POWER PLANT, INCLUDING MEANS TO TREAT COMBUSTION PRODUCTS BETWEEN SUCCESSIVE STAGES OF EXPANSION

Marcel H. L. Sédille, Paris, France, assignor to Societe Rateau (Société Anonyme), Paris, France, a company of France, and René Anxionnaz, Paris, France Application August 4, 1947, Serial No. 766,050
In France September 4, 1946

2 Claims. (Cl. 60—39.17)

It is a known fact that it is possible to use the exhaust gases of a gas turbine plant in order to produce steam for satisfying external heating requirements.

This steam may be obtained under pressure and be expanded before use inside a turbine allowing recovery of a supplementary amount of energy.

It is theoretically possible in a gas turbine plant to approximate the Carnot cycle by performing in the air compressor feeding the gas turbine group a high compression which conduces to a high final temperature of the compressed air and then fractionating the expansion into several turbine stages with an intermediary heating between the successive stages.

Such a high compression may however show the drawback that it is always accompanied by important losses of energy whereby the maximum possible recovery of the spent energy cannot be obtained.

The object of my invention is to provide a gas turbine plant adapted for the production of mechanical energy and steam available for heating purposes and designed in a manner such that the associated production of mechanical energy and heat at a moderate temperature may be performed under the best possible conditions, taking into account the possibilities as concerns gas turbines of to-day, that is the temperatures consistent with the proper mechanical behaviour and the individual efficiencies of the machines.

The following description given out with reference to accompanying drawings, solely by way of example and by no means in a binding sense will allow understanding how my invention may be performed.

Fig. 1 is a diagrammatic view of an embodiment of said invention.

Figure 1a illustrates two sets of air compressors $C_1$, $C_2$, $C_3$, $C_4$, and $C'_1$, $C'_2$, $C'_3$, $C'_4$, the compressors of each set being connected in series and the two sets being connected in parallel.

Figs. 2 and 3 are entropic diagrams illustrating the principle of said invention.

The gas turbine group illustrated in Fig. 1 comprises chiefly a heat exchanger $E_2$ that heats through the exhaust gases from the gas turbine plant the combustion air sucked in by the compressors, the compressors $C_1$, $C_2$, $C_3$, $C_4$ arranged in series and associated with intermediary coolers $R_2$, $R_3$, $R_4$ which coolers are formed by heat exchangers serving for the heating of the water required for heating purposes (cooler $R_4$) up to the temperature of evaporation and then for evaporating same (coolers $R_2$, $R_3$); a heat exchanger or recuperator $E_1$ heating before combustion the air delivered by the compressor $C_4$ through the agency of the gases from the exhaust of the turbine, a combustion chamber operating under constant pressure $Ch_1$, a first gas turbine $T_4$ and further gas turbines $T_3$, $T_2$, $T_1$ in series with the turbine $T_4$ and with one another, gas superheating chambers operating under constant pressure $Ch_2$, $Ch_3$, $Ch_4$ inserted between the exhaust of one turbine and the admission into the next turbine, alternators $G_1$, $G_2$, $G_3$, $G_4$, driven by the turbines $T_1$, $T_2$, $T_3$, $T_4$ and lastly a heat exchanger $R_1$ through which the hot gases at the output of the heat exchanger $E_1$ pass, in order to complete the evaporation of the water begin in the preceding heat exchanging coolers $R_2$ and $R_3$.

By way of example the number of compressors and coolers is four in Fig. 1 but this number may be lesser or higher and instead of being mounted in series they may be arranged in parallel series, the selection of the number and arrangement depending only on the total pressure ratio to be obtained.

It has been supposed moreover that the turbines drive each a compressor and an alternator, but this arrangement is not essential and the distribution of the available power in the turbines may be performed according to well known arrangements so that certain turbines deliver only the power required for one or more compressors while the power developed by other turbines is used for driving receiving machines such as alternators providing the available external energy of the group under the form of electric energy.

The evolution of the thermodynamic cycle of the plant according to Fig. 1 will be explained with reference to the entropic diagram of Fig. 2 (on the cycle of gas turbine plants, see for example S. A. Tucker "Gas Turbines," Mechanical Engineer, June, 1946, p. 363).

From point 18 to point 1 of this diagram, the atmospheric air is heated in the heat exchanger $E_2$ from the ambient temperature $t_0$ up to the temperature $t_c$ required for the water steam to be produced from 1 to 2, compression of the air thus heated in the compressor $C_1$ (which increases the temperature of the air), from 2 to 3, cooling of the compressed air and vaporization of the water in the exchanger $R_2$; from 3 to 4 supplementary compression of the air in the compressor $C_2$; from 4 to 5 cooling of the air and vaporization of water in the exchanger $R_3$, from 5 to 6 further compression of the air in the compressor $C_3$, from 6 to 7 heating up to the vaporization temperature, in the exchanger $R_4$, of the water entering said exchanger at the ambient temperature $t_0$ and simultaneously cooling of the air delivered by the compressor $C_3$ up to the said ambient temperature; from 7 to 8 compression of the air in the high pressure compressor $C_4$; from 8 to 9 heating of the air at high pressure delivered by the compressor $C_4$ first in the exchanger $E_1$ by the exhaust gases then in the combustion chamber $Ch_1$, up to the maximum temperature $t_{mg}$ of the gas turbine cycle; from 9 to 10 expansion of the hot gases in the high pressure turbine $T_4$; from 10 to 11 reheating of the gases in the combustion chamber $Ch_2$; from 11 to 12 expansion of the gases in the turbine $T_3$; from 12 to 13 reheating of the gases in the combustion chamber $Ch_3$; from 13 to 14, expansion of the gases in the turbine $T_2$; from 14 to 15 reheating of the gases in the combustion chamber $Ch_4$; from 15 to 16 expansion of the gases in the low pressure turbine $T_1$; from 16 to 17 cooling of the exhaust gases in the exchanger $E_1$; from 17 to 1' (on the drawing point 1' is shown different from point 1 for a better understanding, but both points are in register) cooling of the gases in the exchanger $R_1$ for the final vaporization of water; from 1' to 18 cooling of the exhaust gases in the exchanger $E_2$ up to the ambient temperature $t_0$ and heating of the sucked air from 18 to 1.

The area A enclosed inside the curve 7, 8, 9, 16, 17, 18, 1, 6, 7 corresponds to the cycle of the gas turbine plant proper. This cycle is practically equivalent to that of an ideal cycle 7—9—17' allowing a maximum possible recovery of energy, taking into account the temperature required for heating. The hatched area C corresponds to the part of energy available for the production of steam for external heating purposes.

The air required for combustion is introduced at atmospheric pressure at point 18 and it is necessary to first heat it. This operation is obtained in heat exchanger $E_2$ by means of the exhaust gases before removing same into the chimney. It is illustrated in the diagram by the line 18—1 for the air and 1'—18 for the gases.

It is found that this cycle allows to increase the energy amount recovered for the production of steam, because the whole area not incorporated in the gas turbine cycle is used in the steam production cycle.

The cooling along 6—7 of the combustive air exchanger $R_4$ is not essential and, if it is omitted, that is to say, if the exchanger R is omitted, I obtain the cycle illustrated in Fig. 3. It will be found that this cycle is a little less favourable as the whole area D is lost in the gas cycle. However cycle of Fig. 3 is a little more homogeneous and allows a more convenient regulation of the plant in cases of varying rates of running.

In the actual state of the technique of gas turbines planes of the type described is chiefly of interest if the temperature $t_c$ required for the steam is comparatively low.

What I claim is:

1. In a plant adapted for producing both mechanical power and steam available for external heating purposes, the combination comprising two separate fluid-lines, one of which is the air-and-gas-line of a turbine power set and the other is a water-and-steam-line for producing steam solely by the excess heat of said power set and for delivering said steam independently of said power set, the air-and-gas-line including: air-suction piping means, a set of air compressors connected in series, the first compressor of said set having its suction side connected to said air-suction piping means, at least one air cooling device arranged between the first and the second compressor of said set, said air cooling device having a cooling water space and an air space, said air space being connected to the delivery side of the first compressor and to the suction side of the second compressor, a combustion chamber adapted to heat the air delivered by the high-pressure compressor of said set, a set of gas turbines arranged in series for driving said compressors and delivering efficient mechanical power, the admission side of the high-pressure gas turbine of said set being connected to the outlet of said combustion chamber, heating means between turbines of said set for reheating the gases flowing from a turbine to the following one, exhaust piping means connected to the exhaust side of the low-pressure turbine of said set and opening onto the atmosphere, and a steam producer having a water-and-steam-space and a gas space, said gas space being inserted in said exhaust piping means; the water-and-steam-line including the water space of said air cooling device and the water-and-steam-space of said steam producer connected in series, said water-and-steam-line having a fresh water feed end connected to the water space of said air cooling device and a steam delivering end directly connected to the water-and-steam-space of said steam producer and separate from said air-and-gas-line, and a heat exchanger having an air space inserted in said air suction piping means of said air-and-gas-line upstream with respect to the first compressor of said line and a gas space inserted in said exhaust piping means of said air-and-gas-line downstream with respect to the gas space of said steam producer.

2. A plant as claimed in claim 1 comprising further a heat exchanger having an air space and a gas space, said air space being inserted in the air-and-gas-line between the high-pressure compressor and the combustion chamber, while said gas space is inserted between the low-pressure turbine and the gas space of said steam producer.

MARCEL H. L. SÉDILLE.

REFERENCES CITED

The following references are of record in the file of this patent:

UNITED STATES PATENTS

| Number | Name | Date |
|---|---|---|
| 2,186,706 | Martinka | Jan. 9, 1940 |
| 2,280,765 | Anxionnaz | Apr. 21, 1942 |
| 2,294,700 | Stroehlen | Sept. 1, 1942 |
| 2,428,136 | Barr | Sept. 30, 1947 |

FOREIGN PATENTS

| Number | Country | Date |
|---|---|---|
| 215,485 | Switzerland | Oct. 1, 1941 |